United States Patent [19]

Tsutsumi et al.

[11] Patent Number: 5,750,084
[45] Date of Patent: May 12, 1998

[54] FLUIDIZED-BED DENITRATING METHOD

[75] Inventors: Kazuo Tsutsumi; Tomoaki Takada, both of Kobe; Yasufumi Sakakida; Tarou Kawamura, both of Akashi, all of Japan

[73] Assignee: Kawasaki Jukogyo Kabushiki Kaisha, Kobe, Japan

[21] Appl. No.: 570,959

[22] Filed: Dec. 12, 1995

[30] Foreign Application Priority Data

Dec. 28, 1994 [JP] Japan ................... 6-338509

[51] Int. Cl.$^6$ .................................. C01B 21/02
[52] U.S. Cl. ................ 423/239.1; 423/351; 423/437.1
[58] Field of Search ............... 423/239.1, 437.1, 423/351

[56] References Cited

U.S. PATENT DOCUMENTS

| | | | |
|---|---|---|---|
| 3,795,730 | 3/1974 | Kalvinskas | 423/239.1 |
| 4,102,980 | 7/1978 | Sasaki et al. | 423/239.1 |
| 4,210,628 | 7/1980 | Ninomiya et al. | 423/239.1 |
| 4,889,698 | 12/1989 | Moller et al. | 423/239.1 |
| 5,270,279 | 12/1993 | Shiraishi et al. | 423/239.1 |
| 5,294,421 | 3/1994 | Muraki et al. | 423/239.1 |
| 5,370,850 | 12/1994 | Thone et al. | 423/239.1 |
| 5,382,418 | 1/1995 | Thone et al. | 423/239.1 |

FOREIGN PATENT DOCUMENTS

A-52-131970  11/1977  Japan.
A-4-322724   11/1992  Japan.

*Primary Examiner*—Wayne Langel
*Attorney, Agent, or Firm*—Oliff & Berridge, PLC

[57] ABSTRACT

A fluidized-bed denitrating method and a fluidized-bed denitrating device are disclosed which are capable, of effectively denitrating a combustion exhaust gas by oxidizing nitrogen monoxide occupying the major portion of $NO_x$ contained in the combustion exhaust gas to nitrogen dioxide which can be reduced at high reduction reaction rate by the oxygen contained in the combustion exhaust gas, and by reducing the nitrogen dioxide by fine carbon particles adhered to fine particles of a fluid medium. A combustion exhaust gas containing at least nitrogen monoxide and oxygen is introduced into a fluidized bed of a fluid medium consisting of fine particles with fine carbon particles adhered thereto. The fine particles of the fluid medium adsorb the nitrogen monoxide, the nitrogen monoxide is oxidized on the surfaces of the fine particles of the fluid medium to nitrogen dioxide, and the nitrogen dioxide is then decomposed into carbon dioxide and nitrogen by the reducing function of the fine carbon particles. The particle sizes of the fine particles of the fluid medium are in the range of 30 to 500 μm, and the particle sizes of the fine carbon particles are 3 μm or below.

4 Claims, 7 Drawing Sheets

COMBUSTION EXHAUST GAS

FLUIDIZED-BED DENITRATING METHOD

BACKGROUND OF THE INVENTION

1. Field of the Invention

The present invention relates to a method of efficiently removing nitrogen oxides ($NO_x$) from an exhaust gas produced by combustion in and discharged from a diesel engine or the like by the particle adsorptive ability of a fluid medium forming a fluidized bed.

2. Description of the Prior Art

There has been a known denitrating/dedusting device for removing $NO_x$ and dust from the exhaust gas from a diesel engine. This known denitrating/dedusting device passes the exhaust gas through a packed catalyst layer to remove $NO_x$ by catalytic reaction and to arrest smoke dust. A fixed-bed catalytic reactor and a gravitational fluidized-bed catalytic reactor disclosed in, for example, Japanese Patent Laid-open (Kokai) No. 52-131970 are denitrating/dedusting devices of the aforesaid type.

Catalysts of a honeycomb structure and those of a filter structure have been used for removing $NO_x$ from the exhaust gas. A gas processing device for processing an exhaust gas or the like disclosed in Japanese Patent Laid-open (Kokai) No. 4-322724 forms a centrifugal fluidized bed by rotating a fluidized-bed reactor of a substantially cylindrical shape to generate a fluidizing gas flow of high linear velocity so that the exhaust gas processing rate may be increased and to make the device of comparatively small size.

Figure 8:
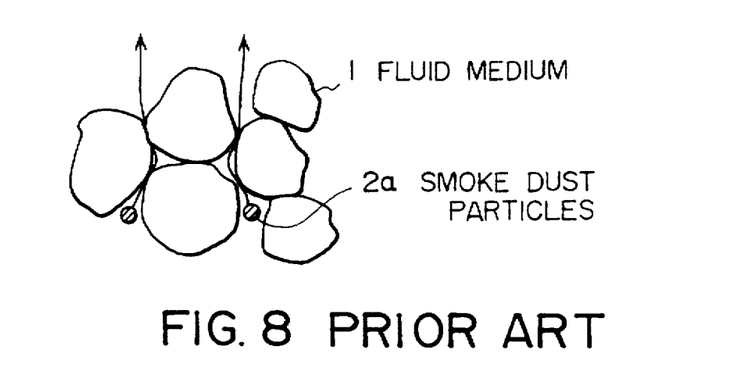
FIG. 8 is a pictorial view for assistance in explaining the state of particles of comparatively small particle sizes of smoke dust in a prior art fluidized-bed denitrating device.
Figure 9:
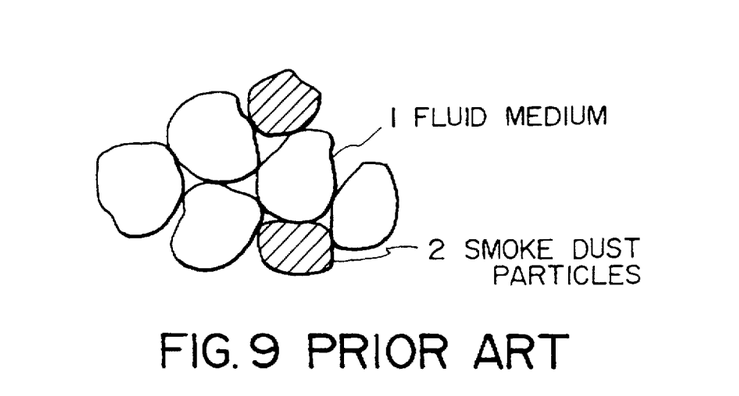
FIG. 9 is a pictorial views for assistance in explaining the state of particles of comparatively large particle sizes of smoke dust in a prior art fluidized-bed denitrating device.

The aforesaid prior art denitrating/dedusting devices need an expensive denitrating catalyst. Although these prior art denitrating/dedusting devices are able to arrest large particles 2 of smoke dust with particles 1 of the fluidized medium as shown in FIG. 9, these prior art denitrating/dedusting devices are unable to arrest small particles 2a of smoke dust satisfactorily and small particles 2a are scarcely held between the particles 1 of the fluid medium and most particles 2a flow through the fluidized bed as indicated by arrows in FIG. 8.

Figure 7:
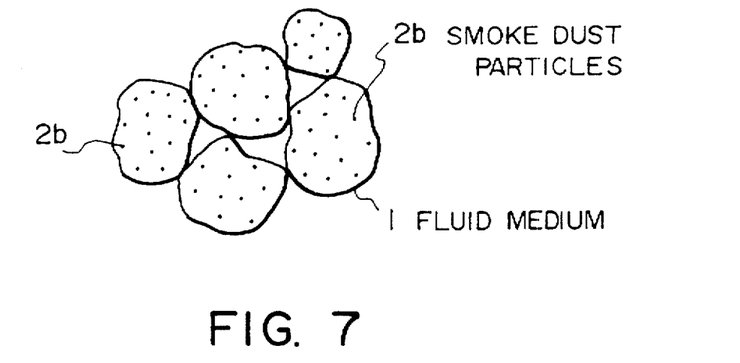
FIG. 7 is a pictorial view for assistance in explaining the state of particles of 3 µm or less in particle size of smoke dust in a fluidized-bed denitrating device in accordance with the present invention.

Recent studies have revealed the fact that, although the residence time of small particles of smoke dust in the fluidized bed decreases with decrease of the particle size, very small smoke dust particles 2b (FIG. 7) of 10 μm or below in particle size, particularly smoke dust particles 2b of particle sizes in as small as 2 to 3 μm or below adhere to the particles 1 of the fluid medium and stay in the fluidized bed, that is, the residence time is extended.

A known denitrating method uses carbon (C) as a reducing agent to reduce $NO_x$. However, as most part of $NO_x$ contained in the combustion exhaust gas is nitrogen monoxide (NO), the reducing reaction can only proceed at low reaction rate.

SUMMARY OF THE INVENTION

The present invention has been made in view of the foregoing problems in the prior art and it is an object of the present invention to provide an effective denitrating method and a device for carrying out the same capable of solving the aforesaid problems.

With the foregoing object in view, in a denitrating method using pulverized carbon in accordance with the present invention, a combustion exhaust gas containing at least nitrogen monoxide (NO) and oxygen is introduced into a fluidized bed of particles of a fluid medium with fine carbon particles adhered thereto, the nitrogen monoxide (NO) is adsorbed by the fluid medium, the nitrogen monoxide (NO) is oxidized into nitrogen dioxide ($NO_2$) on the surface of the fluidized bed, and the nitrogen dioxide ($NO_2$) is decomposed into carbon dioxide ($CO_2$) and nitrogen ($N_2$) due to reduction by the fine carbon particles.

The denitrating method uses, as the fine carbon particles, smoke dust contained in the combustion exhaust gas, such as an exhaust gas discharged from a diesel engine. When the denitrating method is used for the denitration of an exhaust gas of a small fine carbon particle content, such as a boiler exhaust gas, or for the denitration of an exhaust gas not containing any fine carbon particles, fine carbon particles are supplied additionally.

Preferably, the denitrating method uses a fluid medium of a particle size in the range of 30 to 500 μm and preferably the size of the carbon particles is 3 μm or below. The fluid medium may be a denitrating catalyst. A fluid medium of a particle size less than 30 μm is unstable; blowby takes place; and some portions of the fluid medium are not fluidized, making it difficult to carry out gas-solid contact. A fluid medium of a particle size exceeding 500 μm has an excessively large momentum causing rapid abrasion and intense vibrations of the medium.

As mentioned above, fine carbon particle of a particle size exceeding 3 μm are unable to stay between the particles of the fluid medium and travel through the fluidized bed, so that fine carbon particles of the above size are unable to function as a reducing agent.

The fluidized bed may be either a centrifugal fluidized bed or a gravitational fluidized bed into which the combustion exhaust gas is introduced from a fixed wind box.

A fluidized-bed denitration device of the invention in a first aspect comprises: a casing provided with an exhaust gas inlet for receiving therethrough a combustion exhaust gas containing at least nitrogen monoxide, oxygen and fine carbon particles therein; a substantially cylindrical gas dispersing element provided within the casing, having an inner surface and end plates at its opposite ends; fluid medium within the dispersing element; means for driving the gas dispersing element in rotation about a center axis to form a centrifugal fluidized bed of the fluid medium with fine carbon particles adhered thereto on the inner surface thereof; and a discharge pipe connected to one of the end plates to discharge denitrated exhaust gas therethrough.

A fluidized-bed denitrating device of the invention in a second aspect comprises: a casing provided at least with an exhaust gas inlet for receiving therethrough a combustion exhaust gas containing at least nitrogen monoxide and oxygen therein, and a carbon inlet for supplying fine carbon particles into the casing; a substantially cylindrical gas dispersing element provided within the casing, having an inner surface and end plates at its opposite ends; fluid medium within the dispersing element, means for driving the gas dispersing element in rotation about a center axis to form a centrifugal fluidized bed of the fluid medium with fine carbon particles adhered thereto on the inner surface thereof; and a discharge pipe connected to one of the end plates to discharge denitrated exhaust gas therethrough.

A fluidized-bed denitrating device of the invention in a third aspect comprises: a casing; a gas dispersing element disposed in a lower part of the casing; and a wind box disposed below the gas dispersing element and provided with an exhaust gas inlet for receiving a combustion exhaust gas containing at least nitrogen monoxide, oxygen and fine carbon particles therein. A fluidized bed of a fluid medium with fine carbon particles adhered thereto is formed over the gas dispersing element.

A fluidized-bed denitrating device of the invention in a fourth aspect comprises: a casing; a gas dispersing element disposed in a lower part of the casing; and a wind box disposed below the gas dispersing element and provided with an exhaust gas inlet for receiving therethrough a combustion exhaust gas containing at least nitrogen monoxide and oxygen. A carbon particle inlet is formed in the casing at a position above or below the gas dispersing element, and a fluidized bed of a fluid medium with fine carbon particles adhered thereto is formed over the gas dispersing plate.

While the combustion exhaust gas flows through the fluidized bed, NO occupying the major portion of $NO_x$ is oxidized with oxygen contained in the exhaust gas flowing through the fluidized bed into $NO_2$, and then $NO_2$ is reduced by the fine carbon particles of, for example, 0.1 µm in particle size adhered to the particles of, for example, 50 µm in particle size of the fluid medium. Reaction rates of the fine carbon particles with $NO_2$, NO, $N_2O$ and $O_2$ are $NO_2 > NO > N_2O > O_2$, and reactions that take place while the combustion exhaust gas flows through the fluidized bed are represented by:

Rearranging these reaction formulae,

The above and other objects features and advantages of the present invention will become more apparent from the following description taken in connection with the accompanying drawings.

DESCRIPTION OF THE PREFERRED EMBODIMENTS

Preferred embodiments of the present invention will be described in detail hereinafter.

(First Embodiment)

Figure 1:
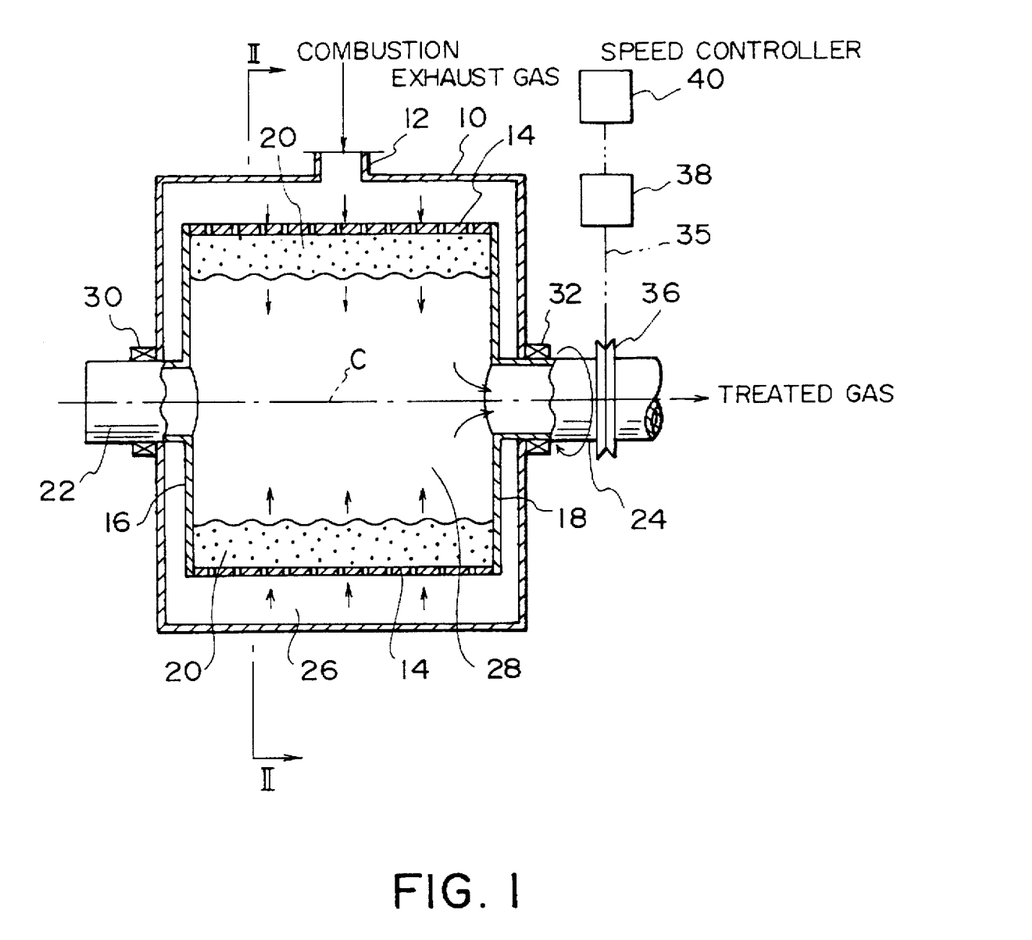
FIG. 1 is a schematic sectional view of a fluidized-bed denitrating device of a first embodiment according to the present invention.
Figure 2:
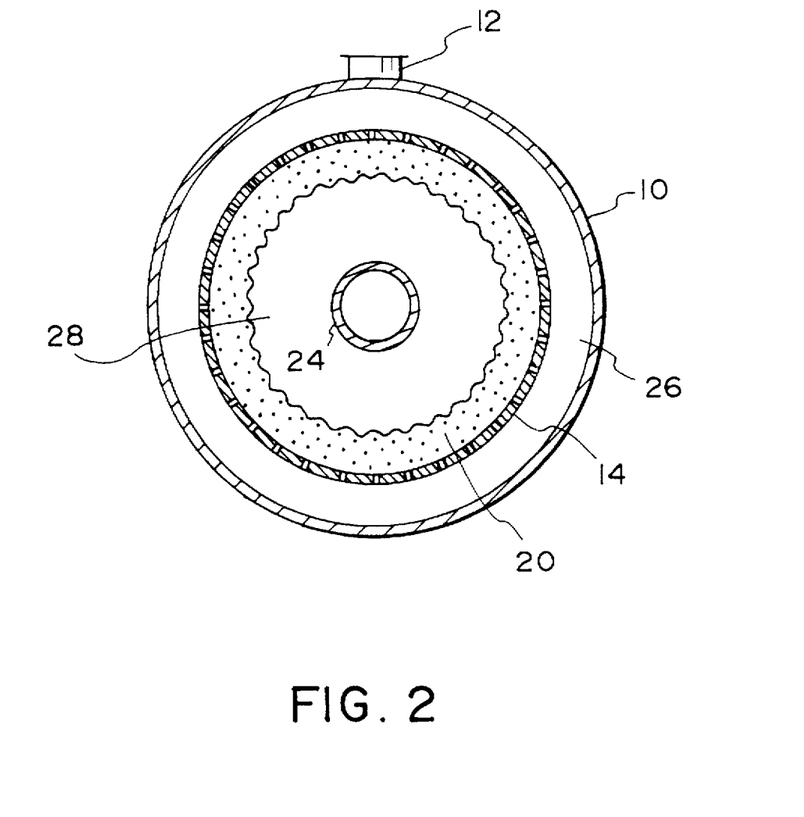
FIG. 2 is a sectional view taken on line II—II in FIG. 1.

Referring to FIGS. 1 and 2 showing a fluidized-bed denitrating device of a first embodiment according to the present invention, a combustion exhaust gas containing fine carbon particles, such as an exhaust gas discharged from a diesel engine, is introduced into a cylindrical casing 10 through an exhaust gas inlet 12. A substantially cylindrical gas dispersing drum 14 is disposed within the casing 10 coaxially with the casing. A first end plate 16 and a second end plate 18 are attached to the opposite ends, respectively, of the gas dispersing drum 14, and the gas dispersing drum 14 is supported so as to be driven for rotation about its center axis C at a desired rotating speed. The rotating speed of the gas dispersing drum 14 is adjustable. The gas dispersing drum 14 contains a fluid medium to form a centrifugal fluidized bed of the fluid medium on its inner circumference. The fluid medium is a pulverized silica, pulverized alumina or a pulverized denitrating catalyst consisting of porous particles of a particle size in the range of 30 to 500 µm capable of readily adsorbing fine carbon particles of less than 10 µm, preferably 3 µm or less in particle size, and capable of being easily fluidized.

A gas discharge pipe 24 serving both as a pipe for discharging a denitrated exhaust gas and as a shaft is joined to a second end plate 18. A hollow shaft 22 is joined to the first end plate 16. An annular wind box 26 is defined between the casing 10 and the gas dispersing drum 14, and the gas dispersing drum 14 has an internal space 28. The shaft 22 and the gas discharge pipe 24 are supported for rotation in bearings 30 and 32, respectively, on the casing 10.

A driving mechanism for rotating the gas discharge pipe 24 comprises a pulley 36 fixedly mounted on the gas discharge pipe 24, a V belt 35 wound around the pulley 36, and a driving source 38 for driving the pulley 36 through the V belt 35. The operation of the driving source 38 is controlled by a rotational speed controller 40 to adjust the rotational speed of the gas discharge pipe 24.

In operation, the fluid medium is supplied into the substantially cylindrical gas dispersing drum 14, the gas discharge pipe 24 is driven to rotate the substantially cylindrical gas dispersing drum 14, and a combustion exhaust gas containing fine carbon particles, such as an exhaust gas discharged from a diesel engine and containing carbon particles of less than 10 µm, for example, of about 0.1 µm in particle size, is supplied through the exhaust gas inlet 12 into the fluidized-bed denitrating device. The particles of the fluid medium are urged toward the inner circumferential surface of the gas dispersing drum 14 by centrifugal force, and are fluidized by the exhaust gas being ejected into the gas dispersing drum 14 to form a fluidized bed 20. The thus fluidized particles of the medium arrest the fine carbon particles in the exhaust gas on their surfaces. NO gas contained in the exhaust gas is adsorbed by the fluid medium, and the NO is oxidized by oxygen contained in the exhaust gas to $NO_2$. The $NO_2$ is reduced by the fine carbon particles adhering to the particles of the fluid medium to harmless carbon dioxide gas and nitrogen gas. The centrifugal fluidized bed makes it difficult for the fine carbon particles to flow together with the exhaust gas and hence the fine carbon particles are easily trapped in the fluidized bed. Consequently, the fine carbon particles are able to be effectively brought into contact with the exhaust gas and are able to stay in the fluidized bed to reduce the $NO_x$ contained in the exhaust gas until the same burn out. The fluidizing movement of the bed 20 serves to promote the reducing reaction.

As described above, fine carbon particles of a size of less than 10 µm, in particular, 3 µm or less, are important in the present invention. Existence of such fine carbon particles in an exhaust gas can be confirmed by passing a predetermined amount of the exhaust gas through a filter and measuring with an electron microscope the size of the carbon particles arrested by the filter. Another method of measuring the size of fine carbon particles in an exhaust gas is to irradiate a light into a pipe through which the exhaust gas flows and to measure a soot density on the basis of a light transmissivity. In this case it is necessary to convert the soot density into soot weight. Before carrying out the method of the present invention, such measurement of the fine carbon particle size is required.

(Second Embodiment)

Figure 3:
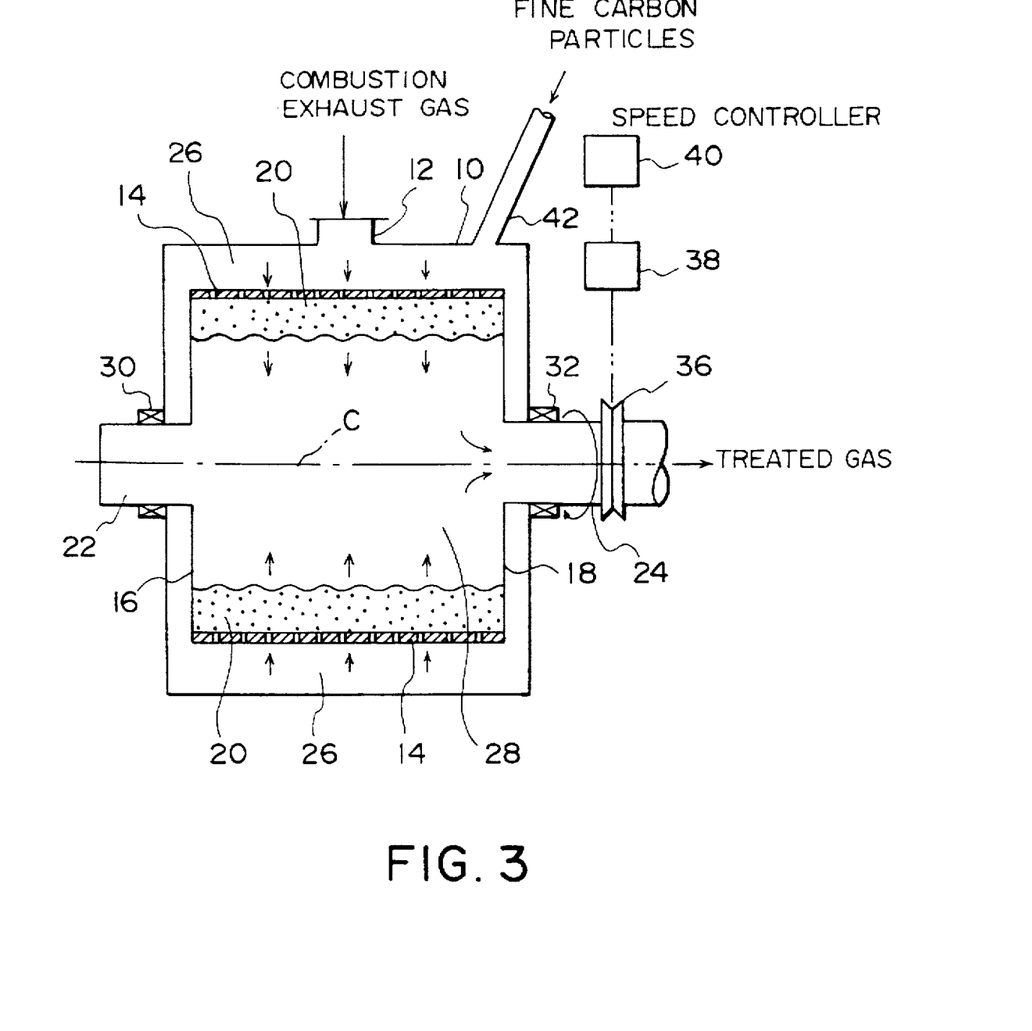
FIG. 3 is a schematic sectional view of a fluidized-bed denitrating device of a second embodiment according to the present invention.

Referring to FIG. 3, a fluidized-bed denitrating device of a second embodiment according to the present invention has a casing 10 provided with a carbon particle inlet 42 through which to supply carbon particles from an external device into the casing 10 when denitrating an exhaust gas having a small carbon particle content, such as a boiler exhaust gas, or an exhaust gas not containing any carbon particles. Preferably, fine carbon particles are supplied by a pneumatic conveyor system. This fluidized-bed denitrating device is similar to the fluidized-bed denitrating device of the first embodiment in the rest of structure and operation.

(Third Embodiment)

Figure 4:
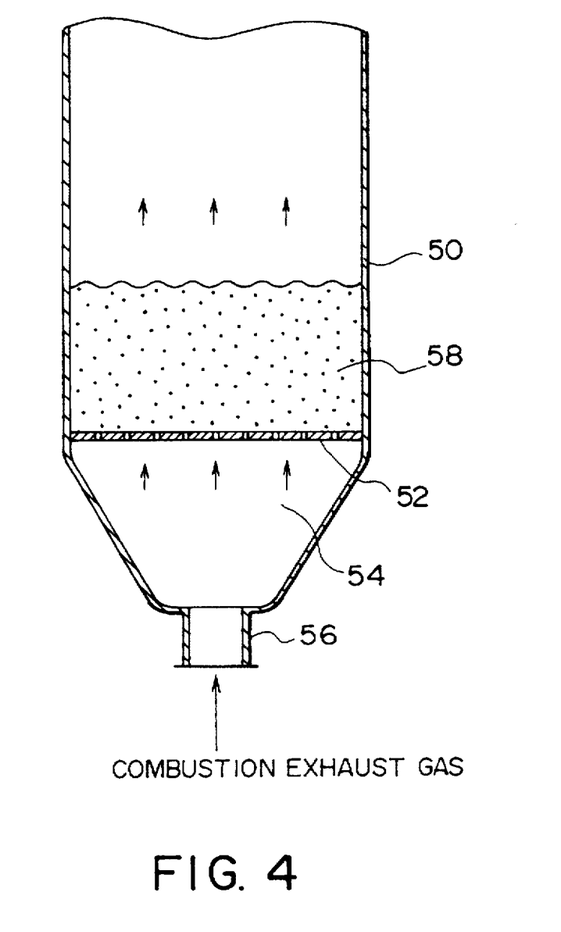
FIG. 4 is a schematic sectional view of a fluidized-bed denitrating device of a third embodiment according to the present invention.

A fluidized-bed denitrating device of a third embodiment according to the present invention has a gravitational fluidized bed 58 as shown in FIG. 4. A gas dispersing plate 52 is disposed in the lower portion of a casing 50, a wind box 54 is formed under the gas dispersing plate 52, and the wind box 54 is provided with an exhaust gas inlet 56 through which to receive a combustion exhaust gas containing NO, $O_2$ and fine carbon particles, such as an exhaust gas discharged from a diesel engine, into the wind box 54. The fluid medium of the fluidized bed 58 consists of fine particles with fine carbon particles adhered thereto. An upwardly ejected flows of the combustion exhaust gas are produced through the gas dispersing plate 52 into the bed 58 to fluidize the same. The reactions that take place in the bed 58 are the same as those in the fluidized-bed nitrating device in the first embodiment.

(Fourth Embodiment)

Figure 5:
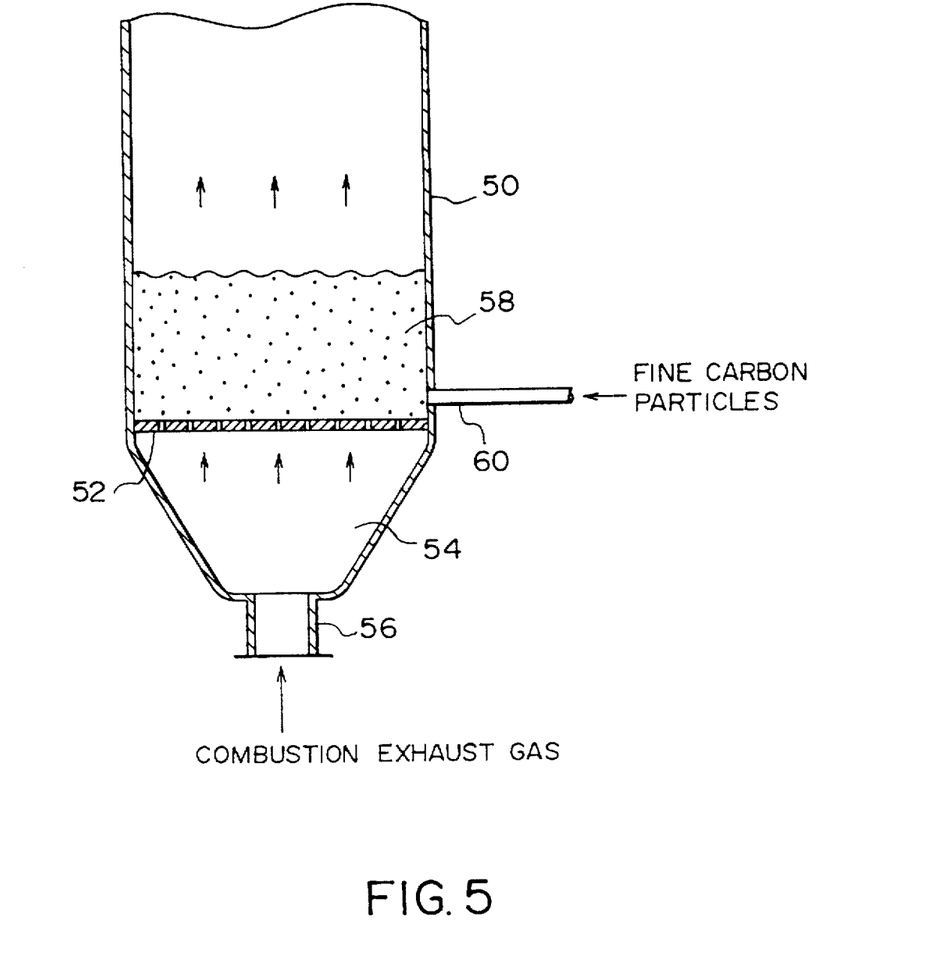
FIG. 5 is a schematic sectional view of a fluidized-bed denitrating device of a fourth embodiment according to the present invention.
Figure 6:
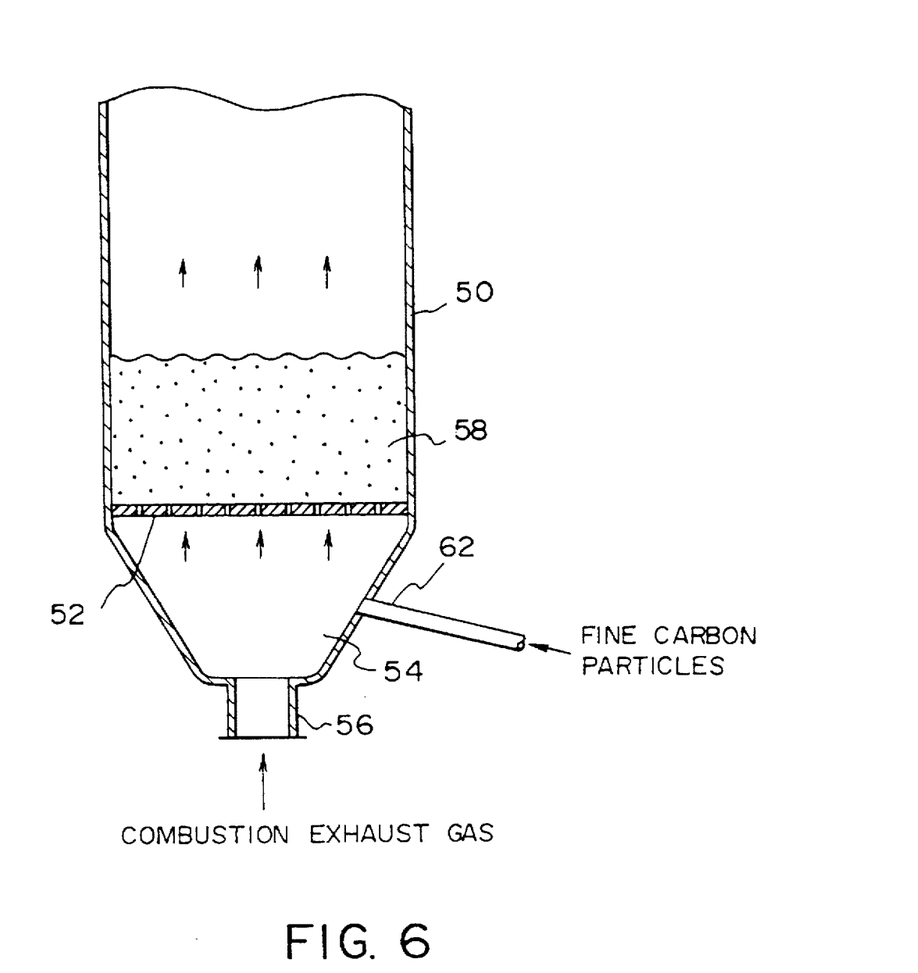
FIG. 6 is a schematic sectional view of a fluidized-bed denitrating device of a fifth embodiment according to the present invention.

A fluidized-bed denitrating device of a fourth embodiment according to the present invention is similar in structure and operation to the fluidized-bed nitrating device of the third embodiment, except that the former has a casing 50 provided with a carbon particle inlet 60 at a position above a gas dispersing plate 52 disposed within the casing 50 as shown in FIG. 5 to supply fine carbon particles into the casing 10 from an external carbon particle supply system when denitrating an exhaust gas having a small carbon particle content, such as a boiler exhaust gas, or an exhaust gas not containing any fine carbon particles. A carbon particle inlet 62 may be formed in the casing 50 at a position below the gas dispersing plate 52, i.e., in a wind box 54 formed under the gas dispersing plate 52, as shown in FIG. 6.

The fluidized-bed denitrating devices thus constructed are capable of efficiently reducing the $NO_x$ contained in a combustion exhaust gas by the fine particle adsobing agency of the fluid medium. Since the centrifugal fluidized bed enables the efficient contact of fine carbon particles with the exhaust gas, the fluidized-bed denitrating device can be formed in a compact construction.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A fluidized-bed denitrating method comprising:

introducing a combustion exhaust gas containing at least nitrogen monoxide and oxygen into a fluidized bed made of fluid medium particles having particle sizes in a range of 30 to 500 µm; causing fine carbon particles having particle sizes of not more than 3 µm to adhere on the fluid medium particles;

causing the fluid medium particles with the fine carbon particles adhered thereto to adsorb the nitrogen monoxide so that the nitrogen monoxide is oxidized to nitrogen dioxide on the surfaces of said fluid medium particles;

decomposing the nitrogen dioxide into carbon dioxide and nitrogen by the reducing agency of the fine carbon particles which are arrested by and moved with the fluid medium particles.

2. A fluidized-bed denitrating method according to claim 1, wherein said fine carbon particles are supplied from an external carbon supply system.

3. A fluidized-bed denitrating method according to claim 1, wherein the fluidized bed is formed by centrifugal force.

4. A fluidized-bed denitrating method according to claim 1, wherein the fluidized bed is gravitationally formed, and the combustion exhaust gas is introduced into the fluidized bed against gravity.

* * * * *